United States Patent
Harrison et al.

(10) Patent No.: US 8,347,148 B1
(45) Date of Patent: *Jan. 1, 2013

(54) COMPUTER SYSTEMS AND METHODS FOR PREDICTIVE PERFORMANCE MANAGEMENT OF DATA TRANSACTIONS

(75) Inventors: Guy Anthony Harrison, Aspendale Gardens (AU); Guy le Mar, McKinnon (AU)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,258

(22) Filed: Sep. 2, 2011

Related U.S. Application Data

(63) Continuation of application No. 12/474,688, filed on May 29, 2009, now Pat. No. 8,015,454.

(60) Provisional application No. 61/082,294, filed on Jul. 21, 2008, provisional application No. 61/058,086, filed on Jun. 2, 2008.

(51) Int. Cl.
*G06F 11/00* (2006.01)
(52) U.S. Cl. .......................................................... 714/47
(58) Field of Classification Search ................. 714/47.3; 703/2, 21, 22
See application file for complete search history.

(56) References Cited

U.S. PATENT DOCUMENTS

| | | | |
|---|---|---|---|
| 7,076,695 B2 | 7/2006 | McGee et al. | |
| 7,110,913 B2 | 9/2006 | Monroe et al. | |
| 7,237,023 B2 | 6/2007 | Menard et al. | |
| 7,363,543 B2 | 4/2008 | Peebles et al. | |
| 7,424,530 B2 | 9/2008 | Chagoly et al. | |
| 7,647,524 B2 | 1/2010 | Ide et al. | |
| 7,676,706 B2 | 3/2010 | Addleman et al. | |
| 7,730,364 B2 | 6/2010 | Chang et al. | |
| 7,734,451 B2 | 6/2010 | MacArthur et al. | |
| 7,769,562 B2 | 8/2010 | Vaidyanathan et al. | |
| 7,826,943 B2 | 11/2010 | Yu et al. | |
| 7,890,296 B2 | 2/2011 | Brown | |
| 7,945,251 B2 * | 5/2011 | Jendbro et al. | 455/414.1 |
| 7,945,430 B2 * | 5/2011 | Canning | 703/2 |
| 2005/0086246 A1 | 4/2005 | Wood et al. | |
| 2007/0083500 A1 | 4/2007 | Zibitsker | |
| 2008/0140692 A1 | 6/2008 | Gehring | |

OTHER PUBLICATIONS

"Adaptive Knowledge-Based Monitoring for Information Assurance", DARPA, Air Force Research Laboratory, May 17, 2004.
Long, "Real-Time Trend Detection Using Segmental Linear Regression", pp. 8 pages.
Shallahamer, Forecasting Oracle Performance, 2007.
Aug. 8, 2012 Listing of Related Applications of Assignee.

* cited by examiner

*Primary Examiner* — Scott Baderman
*Assistant Examiner* — Neil Miles
(74) *Attorney, Agent, or Firm* — Knobbe Martens Olson & Bear LLP

(57) ABSTRACT

Systems and methods are disclosed for monitoring and managing data transactions, such as SQL transactions. In certain examples, a management subsystem generates an alert identifying degrading database transactions to facilitate preventative tuning or other maintenance. In particular, a monitor module tracks performance measurements (e.g., logical reads) of select transactions. A modeler correlates the performance measurements and assigns first performance model(s) to represent the performance measurements and predicted performance measurements of a particular transaction. A trend change module detects a significant change in a trend and/or variance of the performance measurements and can cause the modeler module to generate a second performance model to represent at least a portion of the performance measurements and the predicted performance measurements of the particular transaction. An interface module triggers an alert when the second performance model indicates that the predicted performance measurements of the particular transaction are degrading at or above a threshold rate.

13 Claims, 12 Drawing Sheets

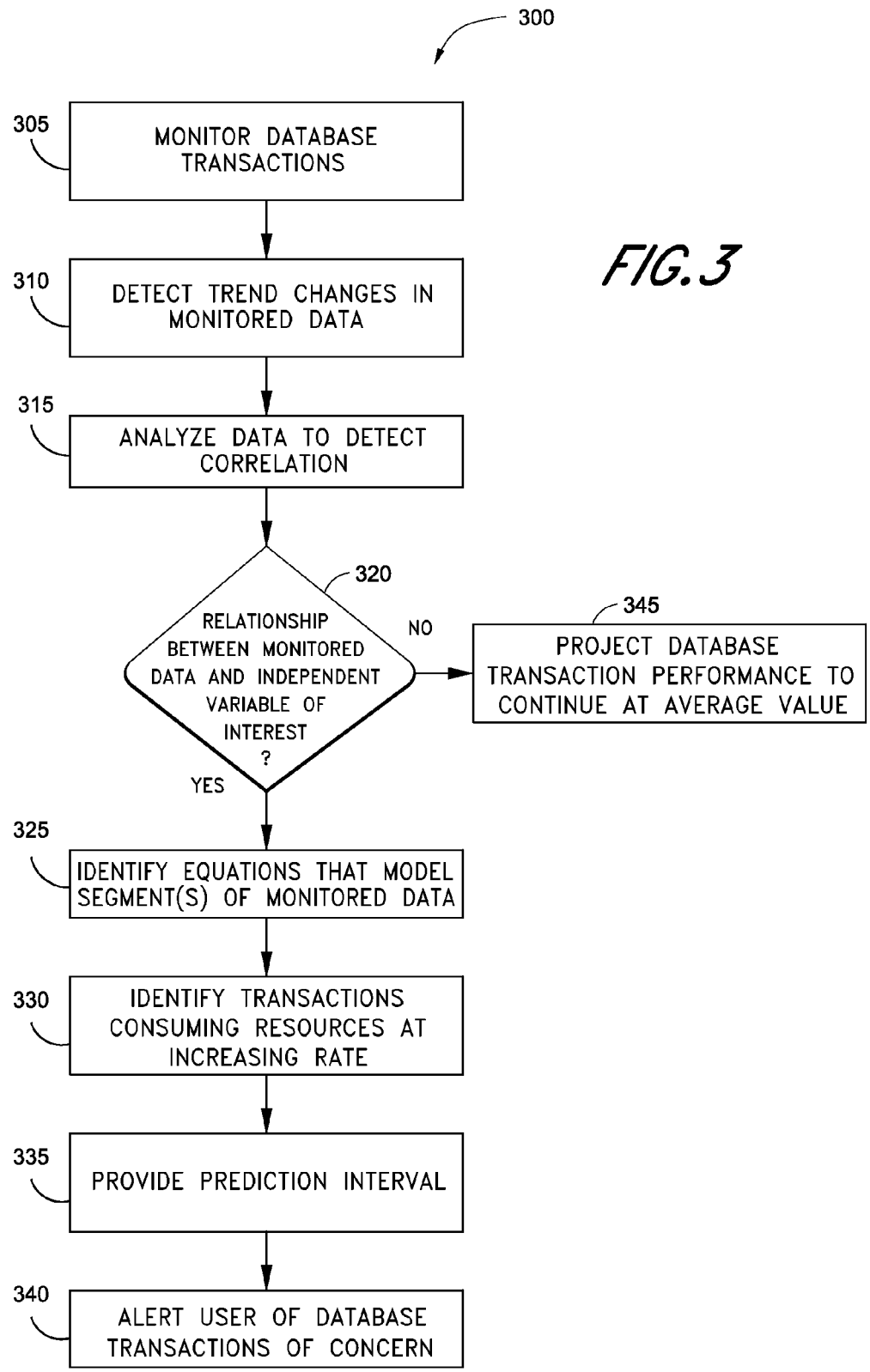

FIG. 6

| SQL Performance | Impending Bottlenecks | | | | |
|---|---|---|---|---|---|
| Project performance out to: 03/31/2010 | | | | | |
| Impending Bottleneck Predictions (Sample Data) | | | | Set Bottleneck criteria | |
| Time Statistic | Avg. Time Now(ms) | Avg. Time Predicted(ms) | % Total Time Now | % Total Time Predicted | |
| Redo – Log write | 18.88 | 97.59 ● | 0% | 2% | |
| Disk I/O – Single-block read | 2.24 ● | 23.93 ● | 76% | 49% | ● |
| Lock – Lock | 1461.22 | 3695.78 | 0% | 5% | ● |
| Cluster – Cluster coordination | | | 0% | 2% | |
| DB buffer – Buffer | 14.02 | 14.02 | 0% | 2% | |
| DB buffer – Free buffer | | | 0% | 2% | |
| Disk I/O – Free Buffer | | | 0% | 2% | |
| Latch – Latch | .56 | .56 | 0% | 2% | |
| Redo – Archival | 5.49 | 5.49 | 0% | 2% | |
| Redo – Log switch | 108.23 | 108.23 | 0% | 2% | |
| Network – Network | 0.00 | 0.00 | 0% | 2% | |
| Disk I/O – Control file I/O | 73.07 | 147.72 | 0% | 2% | |
| Disk I/O – Multi-block read | 38.52 | 87.37 | 0% | 2% | |
| Disk – Datafile write | 78.18 | 554.67 | 0% | 2% | |
| Disk I/O – Direct path I/O | 83.39 | 10739.21 | 0% | 2% | |
| CPU | 0.00 | 0.00 | 20% | 42% | |
| DB buffer – Other DB buffer | 138.61 | 138.61 | 0% | 2% | |
| Disk I/O – DB file parallel read | 295.93 | 295.93 | 0% | 2% | |
| Disk I/O – External file I/O | | | 0% | 2% | |
| Other – Flashback buffer | | | 0% | 2% | |
| Redo – Log buffer | 18.09 | 18.09 | 0% | 2% | |

FIG. 9

| % of Total Now | % of Total Predicted | % Increase | Total Cost Increase | SQL Statement |
|---|---|---|---|---|
| 5% | 22% | 1061% | 293,232.90 | SELECT /*+INDEX_FFS(o) INDEX_FFS(b) ORDERED */ *FROM g_orders |
| 5% | 7% | 233% | 90,917.85 | SELECT* FROM g_orders JOIN g_line_items USING (order_id) JOIN g_customer |
| 5% | 6% | 219% | 85,173.22 | SELECT *FROM G_ORDERS O JOIN G_LINE ITEMS LI USING (ORDER_ID) |
| 5% | 6% | 212% | 82,981.55 | SELECT author_id,fullname,SUM (quantity) FROM g-authors JOIN g_book_author |
| 23% | 19% | 207% | 81,187.53 | SELECT title,SUM(quantity) AS quantity from G_BOOKS join G_LINE_ITEMS using |
| 6% | 5% | 120% | 240,155.72 | SELECT/*+INDEX(o)INDEX(b) ORDERED */ *FROM g_orders o JOIN g_line |
| 14% | 11% | 120% | 66,212.97 | SELECT *FROM G_BOOKS JOIN G_BOOK_AUTHORS USING (BOOK_ID) JOIN |
| 4% | 2% | 116% | 140,048.83 | SELECT SUM(QUANTITY)FROM g_orders JOIN g_line_items USING (order_id) |
| 2% | 1% | 82% | 24,969.87 | INSERT INTO G_LINE_ITEMS (ORDER_ID,LINE_ID,BOOK_ID,QUANTITY) |
| 2% | 1% | 81% | 14,965.45 | DELETE FROM G_CART WHERE CUSTOMERS_ID=:1 AND BOOK_ID=:2 |
| 0% | 0% | 80% | 12,844.15 | select C.CART_SEQUENCE, C.BOOK_ID,B.TITLE,B.AUTHORS, C.QUANTITY |
| | | 80% | 3,043.07 | INSERT INTO G_ORDERS (ORDER_ID,ORDER_DATE,CUSTOMER_ID) VALUES |

COMPUTER SYSTEMS AND METHODS FOR PREDICTIVE PERFORMANCE MANAGEMENT OF DATA TRANSACTIONS

RELATED APPLICATIONS

This application is related to the patents and/or applications set forth in the Application Data Sheet. The patents and/or applications set forth in the Application Data Sheet are hereby incorporated by reference in their entireties into this application.

BACKGROUND OF THE INVENTION

1. Field of the Invention

Embodiments of the invention generally relate to managing and modeling database and resource performance and, in particular, to computer systems and methods for predictive performance management of data transactions.

2. Description of the Related Art

Although the architectural role of the database has reduced in significance from its highly prominent role in the client-server era, application performance continues to remain closely linked to database performance. For example, the database is often required to perform significant amounts of physical disk input/output (I/O) and disk I/O relative to disk sizes and CPU speeds. Also, in multi-tier applications, although middleware layers can be more easily scaled through clustering and load balancing, the database can be more difficult to cluster. For example, for many applications, scaling out the database server is far more difficult than scaling out the application or web servers.

In view of the foregoing, the life of a database administrator (DBA) can be a stressful one. Constant vigilance is needed to ensure database uptime and performance, but despite all due diligence, databases can frequently experience periods of diminished performance. From a business perspective, the cost of database performance "brown outs" can be massive. For online commerce sites, poor performance is a leading cause of lost sales. For mission critical enterprise resource planning or customer relationship management systems, the result can be a substantial loss of productivity. These performance crises can place extreme pressure for quick resolution from the DBA. "Band aid" solutions are, thus, often applied to symptoms, leaving fundamental causes of database performance degradation unresolved.

SUMMARY

Thus, a need exists for remediating the business and human cost of database performance issues by predicting potential performance problems before they occur and by putting in place remedial measures that prevent such issues from impacting business service levels.

For instance, as reactive structured query language (SQL) tuning approaches an era of diminishing returns, with current techniques being fairly mature and in little need of radical enhancement, predictive SQL tuning represents an important step in improving database performance. Similarly, the ability to predict that limited database resources are creating an emerging bottleneck allows the DBA to configure a system either to use these limited resources more effectively or to increase the amount of resource made available.

In view of the foregoing, certain embodiments of the invention represent a practical approach that allows for the identification of database transactions, such as SQL statements, that may become problematic in terms of future performance. In particular, certain embodiments allow for SQL statements to be tuned prior to impacting application performance, allow for sufficient lead time for any scheduled maintenance that may be required, and/or can reduce the duration of disruptions caused by such maintenance.

Certain embodiments of the invention also advantageously provide systems and methods for predictive performance management by:

1. Identifying database transactions (e.g., SQL statements) that are increasing in cost;
2. Projecting the cost into the future to determine which transactions appear to be of most concern due to:
    i) The projected total cost of the transactions in the future being excessive,
    ii) The SQL statement being projected to experience a large increase in cost relative to its current cost, and/or
    iii) The increase in cost escalating at an increasing rate (e.g., at an exponential rate);
3. Providing a prediction interval that establishes the range of variation that can be expected in the future prediction;
4. Identifying discontinuities in the monitored data that can arise when an application/schema change has been applied; and/or
5. Determining interactions between increasing cost on a per execution basis and increasing transaction rate.

In certain embodiments, a method is disclosed for predicting SQL performance. The method comprises selecting a single measure of SQL statement cost. In certain embodiments, such a measure comprises one that is relatively free from variation due to environmental or external factors (e.g., logical reads). The method can further include modeling increases in SQL cost over time and/or against data volumes (e.g., overall and/or on a per-execution basis). In certain embodiments, such modeling comprises: determining whether any statistically significant relationship exists; determining the general form of the relationship (e.g., linear, exponential, logarithmic); and determining a curve that best represents the data trend. The method can further include determining a prediction interval that both represents the statistical variation and the increasing chance that SQL execution or data volume trends will shift in the future. For instance, the prediction interval can be based on percentage values rather than an absolute variance from the selected curve.

In certain embodiments, a system is disclosed for predicting SQL performance, wherein the system comprises a first module configured to select from a plurality of measurements a single measurement of SQL statement cost that is relatively free from variation due to environmental or external factors. The system further includes a second module configured to model increases in SQL cost over time and/or against data volumes. The system also includes a third module configured to determine an adjusted prediction interval that both represents the statistical variation and the increasing chance that SQL execution or data volume trends will shift in the future.

In certain embodiments, a system is disclosed for managing performance of database transactions. The system includes at least one database configured to store data and at least one application configured to interact with the data of the at least one database through a plurality of database transactions. The system further includes a management subsystem configured to generate one or more alerts identifying degrading ones of the database transactions, the management subsystem configured to execute on one or more computing devices. In particular, the management subsystem further includes a monitor module, a modeler module, a trend change module and an interface module.

The monitor module is configured to track one or more performance measurements of the plurality of database transactions, the one or more performance measurements comprising at least one of (i) a total cost of execution of a particular database transaction of the plurality of database transactions, (ii) an average cost of all executions of the particular database transaction, and (iii) an execution rate of the particular database transaction. The modeler module is configured to correlate the one or more tracked performance measurements of the particular database transaction with one or more independent variables and to assign one or more first performance models to represent the one or more tracked performance measurements and predicted performance measurements of the particular database transaction. The trend change module is configured to automatically detect within the one or more tracked performance measurements at least one of (i) a substantial change in a trend of the one or more tracked performance measurements and (ii) a substantial change in a variance of the one or more tracked performance measurements, the trend change module being further configured to cause the modeler module to generate at least a second performance model to represent at least a portion of the tracked performance measurements and the predicted performance measurements of the particular database transaction. The interface module is configured to trigger an alert when the second performance model indicates that the predicted performance measurements of the particular database transaction are degrading at or above a threshold rate.

In certain embodiments, a method is disclosed for managing database performance. The method includes monitoring performance values of a plurality of database transactions and storing the performance values in a storage device. The method further includes correlating the performance values of at least one of the database transactions with one or more independent variables and assigning at least a first performance model to represent past and predicted performance of the at least one database transaction. The method also includes detecting among the correlated one or more performance values a first performance value representing a change in a performance trend of the at least one database transaction and dividing at the first performance value the correlated one or more performance values into a plurality of segments. In addition, the method includes generating at least a second performance model to represent at least one of the plurality of segments, the at least the second performance model indicating a past and predicted performance of the at least one database transaction and issuing an alert when the second performance model indicates that the predicted performance of the at least one database transaction is degrading at or above a threshold rate.

In certain embodiments, a system is disclosed for managing performance of transactions. The system comprises a first module configured to track performance of a plurality of transactions and to store a plurality of data entries indicative of the performance of at least one of the plurality of transactions over a period of time. The system further includes a second module configured to assign a first performance model to represent past and predicted performance of the at least one transaction. In addition the system comprises a third module configured to: automatically detect among the plurality of data entries a first data entry indicative of a change in the performance of the at least one transaction; divide at the first data entry the plurality of data entries into a plurality of data sets; and instruct the second module to further assign a second performance model to at least one of the data sets to represent the past and predicted performance of the at least one transaction. The system also includes a fourth module configured to generate an alert when the second performance model indicates that the predicted performance of the particular transaction represents a degrading performance, and wherein at least one of the first, second, third and fourth modules executes on a computing device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 3 illustrates a flowchart of an exemplary embodiment of a prediction process that can be executed by the performance management subsystem of FIG. 1.

FIG. 6 illustrates an exemplary screenshot of a table for identifying potential bottlenecks in a database system, according to certain embodiments of the invention.

FIG. 9 illustrates an exemplary screenshot of a user interface for identifying possible trend change occurrences in the graph of FIG. 8, according to certain embodiments of the invention.

DETAILED DESCRIPTION OF THE PREFERRED EMBODIMENTS

Figure 1:
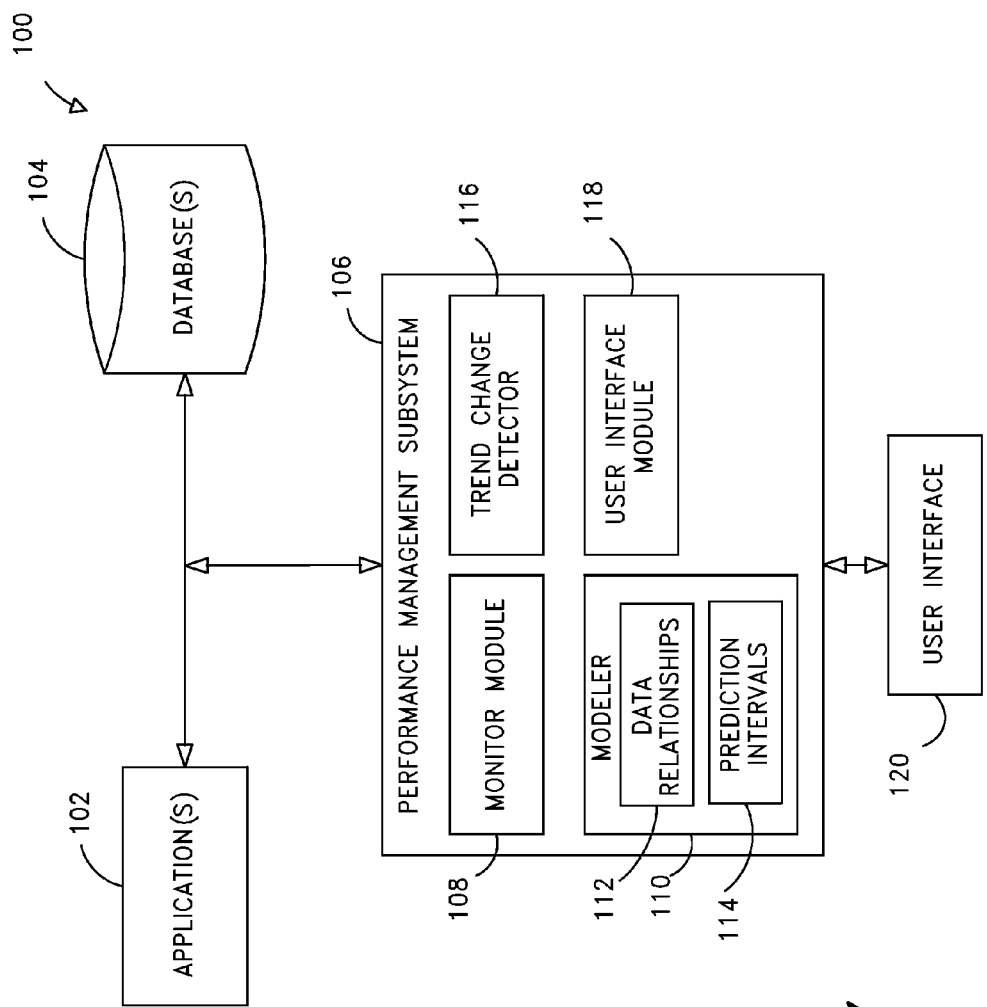
FIG. 1 illustrates a block diagram of a system for monitoring and predicting database transaction performance, according to certain embodiments of the invention.

Systems and methods are disclosed herein for predicative performance management of data transactions. In certain embodiments, disclosed systems and methods advantageously remediate the business and/or human cost of database performance issues by predicting potential performance problems before they occur and by putting in place remedial measures that prevent issues from impacting business service levels.

With this in mind, certain embodiments of the invention represent a practical approach that allows for the identification of database transactions, such as SQL statements, that may become problematic in terms of future performance. In particular, certain embodiments allow for SQL statements to be tuned prior to impacting application performance, allow for sufficient lead time for any scheduled maintenance that may be required, and/or can reduce the duration of disruptions caused by the maintenance. Although the following disclosure will primarily address SQL statements, it will be understood from the disclosure herein that embodiments of the invention can accommodate other types of database and computer transactions.

The SQL language is explicitly non-procedural in that a database optimizer generally determines how best to obtain data requested by a SQL statement. However, database optimizers are not perfect, and developers or DBAs are often charged with correcting poor optimizer decisions and have been required to use largely indirect methods for tuning SQL, such as, for example: specialized tools to reveal the execution paths chosen, hints to influence the execution plan, tools to manipulate statistics, "pin" desirable plans, combinations of the same and the like. Furthermore, conventional optimizers are not able to compensate for database design or implementation shortfalls, such as, for example, a missing index. Developers and DBAs can, thus, invest a substantial amount of time addressing these issues.

Because SQL statements are responsible for almost all the I/O generated by an application, SQL tuning becomes important to avoid an I/O-bound application. Paradoxically, poorly tuned SQL can become CPU-bound rather than I/O-bound. This is due to relational database management systems (RDBMSs) going to heroic lengths to avoid any unnecessary I/O. Very sophisticated caching mechanisms are further employed to ensure that no unnecessary physical I/O occurs.

As a result, SQL tuning can play a significant role in database optimizing. In certain embodiments, SQL tuning involves identifying SQL statements that need tuning by benchmarking or production monitoring. Various tools are then used to diagnose the root cause (e.g., a missing index or SQL syntax anti-pattern). The selected performance solution(s) are then deployed to production. While such SQL tuning can be important, many are experiencing what appears to be diminishing returns as such tuning is improved.

For instance, improvements in SQL optimizers reduce the number of "trivial" SQL issues. In the days of the "dumb" optimizer, a poorly worded SQL statement might fail to employ an index, for example, and suffer from orders of magnitude of degradation. Today's optimizers, employing adaptive and offline optimization strategies, rarely allow such problems to occur. The remaining issues, such as the creation of new indexes in production, partitioning, denormalization, combinations of the same or the like, generally require non-trivial solutions. Production systems often need substantial lead time to deploy these performance solutions, and the downtime required to implement the solutions often increases as the underlying data volumes increase.

In view of the foregoing, the following disclosure provides inventive systems and methods for shifting from reactively tuning database transactions to anticipating database performance problems and correcting them before they occur. In certain embodiments, the approach to predicting database performance problems is two-fold:

1. Identify SQL statements that are consuming resources at an increasing rate or that show degradation in response time over time. For these SQL statements, inventive systems and methods disclosed herein can project trends into the future to identify SQL statements that need to be presently tuned to avoid future problems; and
2. Identify database resources (e.g., locks, latches, I/O channels, or the like) that are nearing capacity and that will form a performance bottleneck. These resources can be increased in capacity or used more efficiently in order to meet projected demand.

The predictive performance management approach outlined herein with respect to certain embodiments of the invention is based on generalized modeling and a set of predictive algorithms rather than following an exhaustive modeling approach. For instance, certain embodiments of the invention can perform one or more of the following:

1. Employing a single measure of SQL statement cost that is relatively free from variation due to environmental or external factors. In certain embodiments, logical reads are the preferred measurement;
2. Modeling increases in SQL statement cost over time and/or against data volumes, both overall and on a per-execution basis. This can involve:
    i. Determining whether any statistically significant relationship exists in the monitored data,
    ii. Determining the general form of the relationship (linear, exponential, logarithmic), and
    iii. Determining a curve that best represents the trend; and
3. Determining an adjusted prediction interval that both represents the statistical variation and the increasing chance that SQL execution or data volume trends will shift in the future.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed concurrently and/or in an order other than that specifically disclosed, or multiple blocks or states may be combined in a single block or state. In yet other embodiments, a single block or state can be executed as multiple blocks or states.

The term "transaction," as used herein is a broad term and is used in its ordinary sense and includes, without limitation, any atomic interaction with a database or other data repository. For example, "database transactions" can include individual SQL statement executions, multiple SQL statements (e.g., SQL statements that are grouped to succeed or fail as a unit), and/or stored procedure calls. Embodiments of the invention can further be applied to other types of computer transactions, such as, for example, method calls (e.g., JAVA method calls), hypertext transfer protocol (HTTP) requests, events, disk storage interactions, or the like, without departing from the scope of the disclosure.

FIG. 1 illustrates a block diagram of a database system 100 for monitoring and predicting database transaction performance, according to certain embodiments of the invention. In certain embodiments, the database system 100 conducts predictive performance management of SQL statements. In yet other embodiments, the database system 100 can monitor other or additional types of database or data transactions such as, for example, database hardware or resource utilization (e.g., CPU percentage, memory percentage, disk latency, disk throughput or the like).

As shown, the system 100 includes one or more applications 102 that communicate with one or more databases 104. In certain embodiments, the application(s) 102 comprise client programs that connect to a database management system (DBMS) to provide users with the ability to interact with the data of the databases 104, such as, for example, to select, modify, organize, delete, or the like, some or all of the foregoing data. Exemplary application programs include payroll or inventory programs, online stores, or the like.

The database 104 can comprise any collection of information or data organized in a way that computer programs can quickly access or select desired portions of the collection. Exemplary DBMSs for use with such databases 104 include those commercially available from Oracle Corporation, IBM, or the like.

The system 100 further comprises a performance management subsystem 106 that monitors database transactions between the application(s) 102 and the database(s) 104. In certain embodiments, the performance management subsystem 106 advantageously monitors SQL statements generated by the application(s) 102 and predicts performance of such transactions to identify potential database performance issues. As shown, the performance management subsystem 106 further comprises a monitor module 108, a modeler 110, a trend change detector 116 and a user interface module 118.

The monitor module 108 measures and records performance statistics of database transactions associated with the application(s) 102 and the database 104. In certain embodiments, the monitor module can determine a "cost" of a non-scalable SQL statement. For instance, the monitor module 108 can measure logical reads associated with a particular SQL statement and/or type or group of SQL statements (e.g., the number of data blocks required to satisfy a SQL statement). In certain embodiments, this cost variable is virtually "noise free" since increases in logical reads generally do not occur unless the SQL statement actually consumes more resources. Furthermore, the logical read rate is generally correlated with both CPU and disk I/O.

In yet other embodiments, other or additional cost variables and/or performance values can be measured with respect to a SQL statement. For example, the monitor module 108 may measure an elapsed time, which in turn governs response times and throughputs, for execution of a SQL statement. In certain embodiments, however, this measurement can be "noisy," as it may vary depending on the load placed by other SQL statements and/or on the effectiveness of the database's cache. For instance, a second execution of an identical SQL statement is generally far quicker due to the presence of necessary data in the database cache. Moreover it is a characteristic of some sub-optimal SQL statements that they access data repeatedly during execution. For instance, the "nested table scan" reads every row in an inner table once for every row in an outer table. These rows are generally cached in memory and, while the SQL appears to be very I/O efficient, the SQL statement consumes excessive CPU as it repeatedly reads through the same blocks in memory.

In yet other embodiments, disk I/O, CPU consumption, or the like can be measured or tracked as performance variables relating to database transaction performance. Moreover, measurements taken by the monitor module 108 can be stored as one or more data entries in a memory for future processing and/or manipulation.

In certain embodiments, the monitor module 108 can further distinguish between two levels of performance or cost. First, monitor module 108 can measure the cost of a single SQL execution ("cost per execution"). Second, the monitor module 108 can measure the cost of all SQL statement executions ("aggregate cost"). In certain embodiments, increases in the aggregate cost can be caused both by increases in individual SQL statement cost or by an increase in transaction rate.

The modeler 110 fits one or more data relationships, or performance models, to the performance statistics measured by the monitor module 108. For instance, the modeler 110 can communicate with the monitor module 108 to identify a small number of variables to represent the cost of SQL execution and that can be used to predict future execution time and contention overhead. In certain embodiments, the modeler 110 determines both (1) the appropriate monitored data to model and (2) an appropriate equation, function, or combination of multiple equations and/or functions, to model such data. For example, in certain embodiments, as discussed in more detail herein, the modeler 110 can create a model of the data based on a relatively few number of variables.

One alternative approach to predictive performance management is to attempt to create a "perfect" model of database performance. This approach includes creating a mathematically precise model of SQL performance that accounts for as many variables as possible and projecting SQL performance by simultaneously projecting future values of all of these metrics. Moreover, such detailed modeling is based on multiple finer-grained predictive models: future transaction rates, breakdown of SQL statements to transactions, data volume sizes given transaction rates and archiving policies and the like. A failure to model any of these components correctly invalidates the detailed model, and the effort required to establish these foundation predictive models can be prohibitive.

In certain embodiments, this alternative approach may involve a modeler independently modeling each SQL statement in an application and each step within a SQL statement. Each step can be assigned its own model associating the step's performance to underlying data volumes and those data volumes independently predicted using current and expected transaction rates coupled with archival and retention policies. These myriad models are then used to simulate cost when arbitrary SQL execution rates are simulated.

In yet other alternative embodiments, a modeler can further attempt to model fluctuations in SQL execution rates using queuing theory and/or time series analysis. For instance, while forming such extensive models, the modeler can take into account one or more of the following: queuing models (SQL overhead predictions, arrival/response models, SQL execution rate models), execution step models, SQL models, time series models, SQL execution rate predictions (transaction/SQL mapping, transaction rate predictions), data volume predictions (transaction/data mapping, archiving and retention models, transaction rate predictions) or the like.

This type of modeling approach, however, can have one or more of the following drawbacks:
1. The number of underlying assumptions in the resulting model is very high, and the risk that the model is based on an invalid assumption is also high;
2. The model requires an extremely detailed understanding of the performance characteristics of individual SQL statements and how these combine to overall application performance;
3. The models are generally too complex for validation by the target user; and 4. The models involve nested predictions; rates of transactions, data volume growths, and the like, must be accurately modeled before the final model can be established.

The end result is that while these models theoretically promise a high degree of precision, they lack both practicality and accuracy. Such modeling often results in a trade-off between precision and accuracy. As the model becomes more and more complex, the assumptions and assertions made against the real world become more and more specific and, as a result, the model can be much less likely to match reality. That is, as the assumptions and precision of the model increases, the accuracy and probability that the model applies to the real world data reduces.

While the "perfect" models require advanced statistical modeling techniques, in certain embodiments of the invention, the modeler 110 can take a more straightforward approach that includes:

1. Correlation—allows determining if any relationship exists between the variables;
2. Partial correlation—allows elimination of spurious correlations that occur between two unrelated variables that share common relationships with other variables;
3. Regression—allows a "line of best fit" to be determined; and
4. Non-linear and multivariate regression—allows for multiple predictor variables and the determination of "curves of best fit."

In view of the foregoing, in certain embodiments of the invention, the modeler 110 creates a model that makes fewer assumptions about the underlying data and that involves a relatively small number of variables with respect to predictive performance of database transactions. Thus, certain embodiments of the invention do not incorporate a large number of variables into the generated models, but identify a small set of variables with a relatively high predictive value.

Two common underlying causes of increases in SQL overhead are:

1. An increase in the data volumes within the tables accessed by the SQL statement(s); and
2. An increase in the rate of execution of transactions which include the SQL statement(s).

A non-trivial SQL statement often contains references to more than one table, and SQL statements are often shared across multiple transactions. To avoid overly complex modeling, and to concentrate instead on a small number of generalizable variables, the following predictors can be used in predictive performance management by certain embodiments of the invention:

1. Time: data volume and transaction rates usually increase over time, and prediction is generally interested in establishing the time at which some state will be reached; and
2. Size of the underlying tables or, to further approximate, size of the database as a whole.

In view of the foregoing, in certain embodiments, the modeler 110 creates a generalized model that attempts to relate at least one of the following:

1. A total cost of executions of each specific SQL statement;
2. An average cost for all executions of each specific SQL statement; and
3. An SQL execution rate for each specific SQL statement with at least one of the following:
1. Date/time;
2. Data volumes; and
3. Execution rate of the SQL statement.

Moreover, the modeler 110 can be configured to extend the generalized model into the future (e.g., to a user-specified time) to predict the performance of the monitored database transaction(s).

Although the modeler 110 is described herein with reference to predicting performance trends of database transactions, it should be understood that the modeler 110 can comprise a reusable module that can be utilized to predict trends within any univariate or multivariate data. For example, in other embodiments of the invention, the modeler 110 can model and predict trends such as spending habits of individuals or population growth (e.g., of insects).

As illustrated, the modeler 110 further comprises stored data relationships 112 and prediction interval data 114 for use in constructing models. In certain embodiments, the data relationships 112 and prediction interval data 114 comprise information stored on one or more storage devices accessible by the modeler 110.

The data relationships 112, in certain embodiments, provide a plurality of predetermined models, curves or other generic representations usable to project data transactions trends. For instance, as described in more detail below with respect to FIG. 2, the data relationships 112 may comprise a plurality of curves used to project data transaction performance based on a sample set of monitored data points.

The prediction intervals 114 comprise statistical data that allow certain embodiments of the invention to account for anticipated variation in data transaction performance. For example, certain embodiments of the invention apply statistical techniques to determine the line or curve of best fit for data, once the broad nature of the relationship has been established. However, the actual cost of a SQL statement in the future can vary based on fluctuations in the transaction rate and/or data volumes. Thus, the prediction interval data 114 can be used to calculate a "boundary" surrounding the selected model within which a specific percentage of data points is expected to reside.

Thus, embodiments of the invention generally do not establish an exact predicted value based on historical trending but, rather, generate a probable range of values around the prediction. This prediction interval can take into account various variables, such as, for example, an independent variable identifying the context of the prediction (e.g., date and/or time associated with predicted value), a confidence or probability of the prediction (e.g., a certain probability that future values will fall within a specified range), a dependent value that is predicted, and an error range. Moreover, a chance of a change in application patterns increases over time and for this reason, certain embodiments of the invention increase the range of the prediction interval as the model is projected into the future.

The trend change detector 116 is configured to identify trend changes within monitored data that may reflect a change in the database system and that can potentially disturb the integrity of a model. For instance, in certain embodiments, one or more of the following events can result in a change in the performance of a SQL statement or the database system 100 as a whole:

1. Changes in the underlying hardware;
2. Changes in the software layer (e.g., operating system or RDBMS upgrade);
3. Abrupt changes in data volumes (e.g., a bulk data load);
4. Changes in the physical data schema (e.g., a new index); and
5. Changes in SQL execution plan as a result of optimizer re-calculation.

If changes in performance, based on such events, are not accounted for, the modeler 110 of the performance management subsystem 106 may reach an invalid conclusion as to an appropriate trend or model for the data.

Figure 4A:
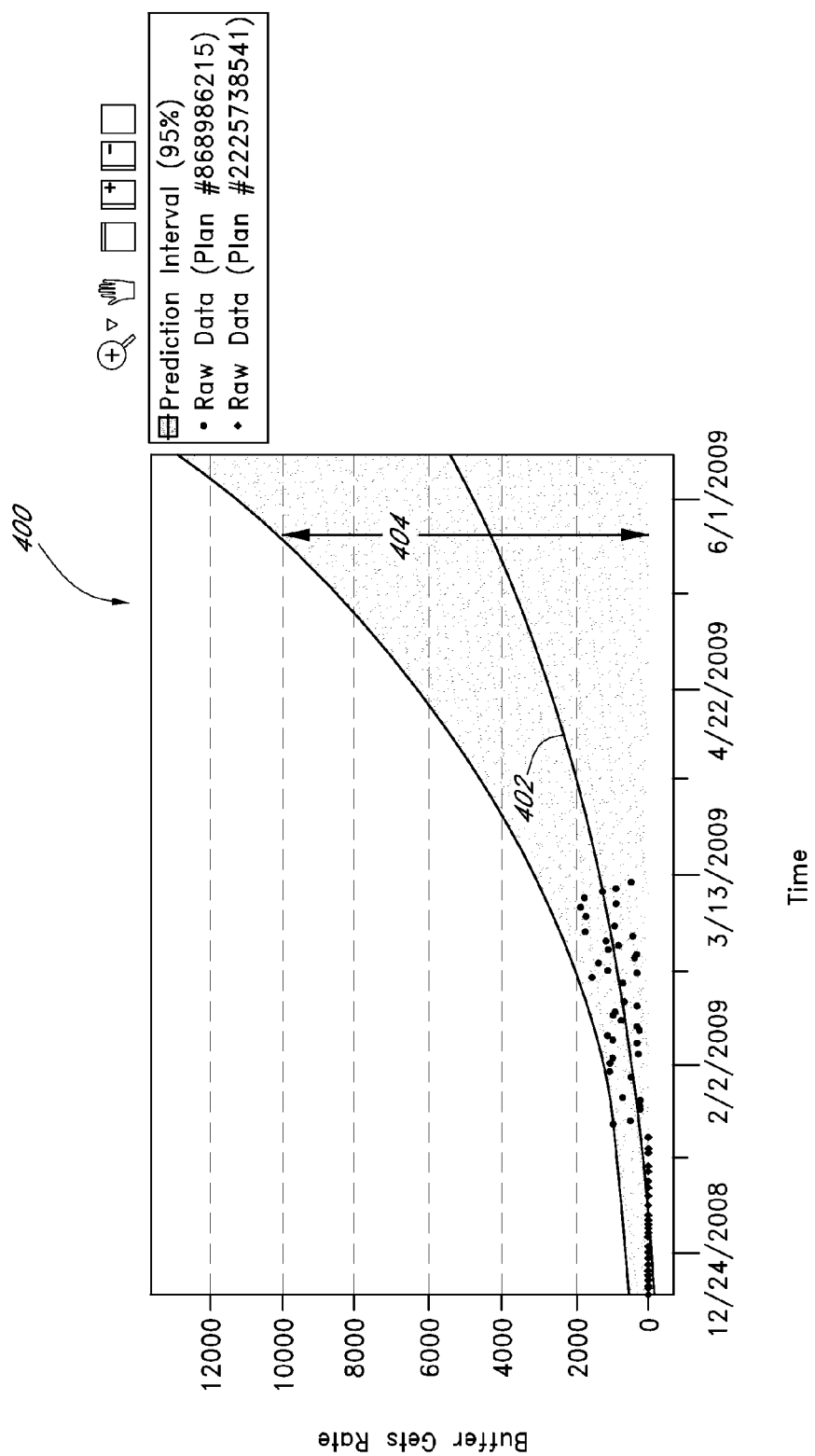
FIGS. 4A and 4B illustrate exemplary screenshots depicting effects of a trend change detection process on a prediction of database transaction performance, according to certain embodiments of the invention.
Figure 4B:
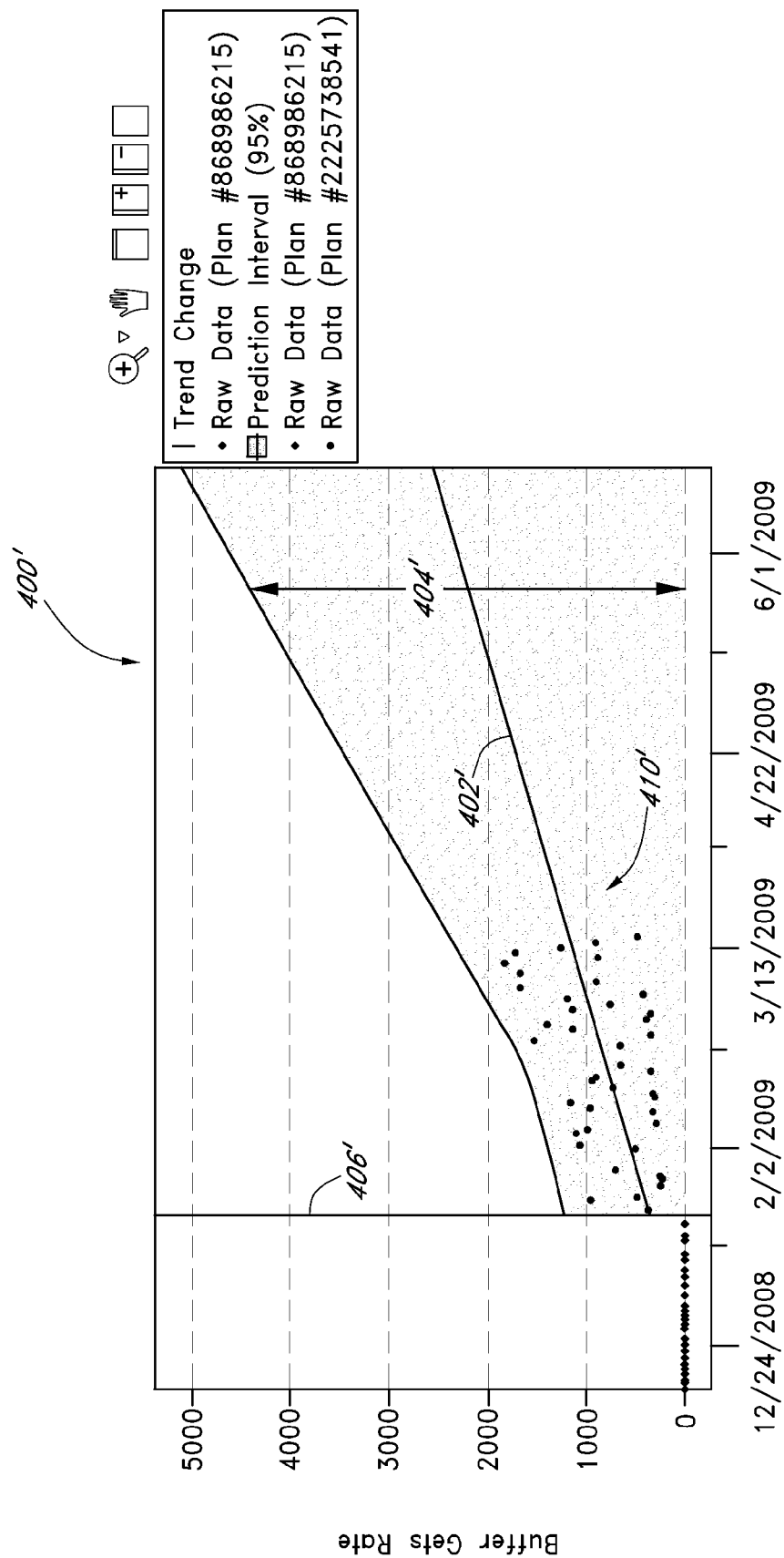

Thus, as discussed in more detail with respect to FIGS. 4A and 4B, the trend change detector 116 alerts the user to possible trends changes and provides a means for more accurately modeling database transaction performance.

The user interface module 118 communicates information to and/or receives information from a user via a user interface 120. For instance, the user interface module 118 can inform a user through the user interface 120 when one or more monitored database transactions is projected to have a problematic cost and/or degrade at or above a threshold rate (e.g., an exponential curve).

In certain embodiments, the user interface 120 comprises a display. Moreover, in certain embodiments, the user interface 120 can be associated with a computer device on which one or more of the application(s) 102 executes.

In certain embodiments, the performance management subsystem 106 comprises one or more server computers for executing one or more of the components described above. In yet other embodiments, components of the performance management subsystem 106 can execute on other types of computer devices, such as, for example, personal computers, workstations, virtual computing systems, portable computing devices and the like.

Figure 2:
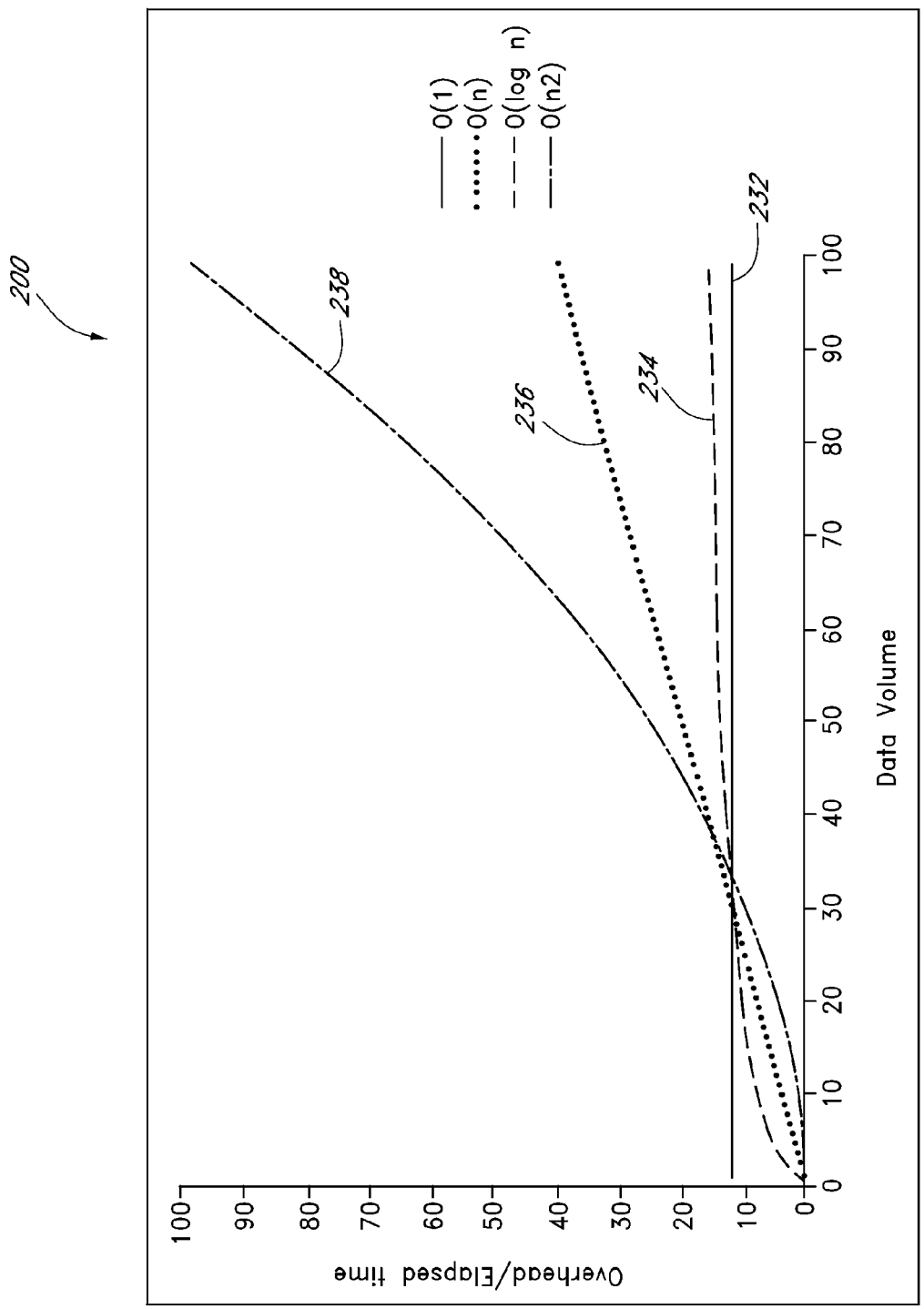
FIG. 2 illustrates exemplary performance models or data relationship curves usable by the performance management subsystem of FIG. 1.

FIG. 2 illustrates exemplary data relationship functions or curves usable for modeling data according to certain embodiments of the invention. In particular, the functions correspond to the "Big-O" notation and can be used to anticipate static, linear, logarithmic or exponential relationships between SQL statement cost and data volume, time or execution rates. In certain embodiments, such functions may be represented in the data relationships 112 of the modeler 110.

In certain embodiments, SQL statement execution is composed of multiple steps, and each of these steps can conform, in general, to relationships between data volumes and execution time. Certain embodiments of the invention represent SQL step execution relationships with the illustrated "big O" notation.

For instance, a graph 200 of FIG. 2 illustrates four different types of curves that can be used by embodiments of the invention to represent data transaction performance. These four curves, with accompanying explanations are as follows:

1. O(1) curve 232 (constant, static): The transaction operation takes the same amount of time, regardless of the amount of underlying data. Well-structured hash indexes often show this relationship.
2. O(log n) curve 234 (logarithmic): Execution time increases with data volume size but at a decreasing rate. This is roughly the pattern often observed in index-based lookups of unique values.
3. O(n) curve 236 (linear): As data volumes increase, execution time of the transaction increases proportionally. This pattern is often observed in full table scans or non-unique index scans.
4. $O(n^2)$ curve 238 (exponential). As data volumes increase, execution time of the transaction increases at an ever increasing rate. This is the pattern often observed in nested scans (e.g., for each row in result set A, scan through all of set B looking for a match).

In certain embodiments, actual SQL plans represent interactions between multiple execution steps, each of which may follow one of the "big O" notations. However, at a high level analysis, one of the patterns usually dominates. For instance, in a nested table scan coupled with a B-tree index lookup, the exponential characteristics of the nested scan (curve 238) eventually dominate the logarithmic pattern of the index lookup (curve 234).

In general, exponential SQL performance patterns have become less prevalent as vendors improve their SQL query optimization layer and as more efficient access algorithms are employed. While exponential patterns are certainly still possible, they are usually associated today with poor indexing decisions rather than by poor optimization code.

However, SQL statement(s) that display a linear execution pattern with respect to the underlying data still often exhibit exponential resource consumption when increasing data volumes are coupled with increasing execution rates. Furthermore, since SQL execution rates and data volumes are often increasing together, one can observe an exponential relationship due to the interaction between the two. If each execution is increasing in cost, and executions are happening more rapidly, then the end result can be an exponential growth in the overall cost of the SQL statement, which in turn could drive increasing contention for limited resources.

From FIG. 2, it can be seen that linear and exponential patterns represent the SQL transactions most likely to show problems in the future, even if current data volumes allow them to execute with acceptable overhead. Of the two, the exponential pattern represents the greatest threat, since performance can degrade more steeply as data volumes increase and can eventually overwhelm the capacity of a computer system. In certain embodiments, systems and methods disclosed herein can use modeling techniques to identify SQL statements that may be problematic in the future.

Certain embodiments of the invention first determine whether or not there exists a relationship between the cost variable and the predictor. Such embodiments then attempt to determine the broad nature of the relationship: linear, exponential, or logarithmic. Finally, embodiments of the invention can construct a line or curve of best fit to the data.

Although FIG. 2 illustrates one example of a set of functions usable with inventive systems and methods disclosed herein, other embodiments of the invention can utilize different sets of functions or other statistical patterns for representing and/or depicting database transaction performance.

FIG. 3 illustrates a flowchart of an exemplary embodiment of a predictive management process 300 for a database system. In certain embodiments, the process 300 can be executed by the performance management subsystem 106 of FIG. 1 to monitor data transactions and alert the user of transactions that are increasing in cost. For exemplary purposes, the process 300 will be described with reference to the components of the database system 100 of FIG. 1.

At Block 305 the monitor module 108 measures performance characteristics of a SQL statement or group of SQL statements. As discussed above, such performance characteristics can correlate, for example, at least one of aggregate SQL cost, SQL cost per execution, and SQL execution rates with at least one of date/time, data volume information, and SQL execution rates in certain embodiments of the invention.

At Block 310, the trend change detector 116 identifies possible trend changes within the monitored data that may reflect a change in the database system 100 or its underlying performance. For example, the trend change detector 116 can execute a trend change detection algorithm to identify a plurality of segments of a set of measured data points, wherein the segments can be independently assigned different data relationship models. Details of an exemplary trend change detection process are described below with respect to FIG. 4C. Moreover, exemplary source code and accompanying annotations for a trend change detection algorithm usable with embodiments of the invention is disclosed in Appendix A, which is attached hereto to be considered part of this specification.

At Block 315, the modeler 110 analyzes each segment of the monitored data to detect any correlation between the monitored data and select independent variable(s) (e.g., time). In certain embodiments, the modeler utilizes Pearson correlation techniques to analyze the monitored data. If a determination is made at Block 320 that the monitored data is correlated, the modeler 110 assigns one or more performance relationship(s) to the detected segments of the monitored data (Block 325). In certain embodiments, the relationship(s) comprise one or more equations from the data relationships 112 that model the monitored data performance.

In certain embodiments, the modeler 110 is configured to assign the simplest performance relationship 112 available that accurately represents the data. For instance, in certain embodiments, when the initial performance relationship or model selected by the modeler 110 comprises a non-linear (e.g., exponential or logarithmic) equation, the modeler 110 can evaluate the selected model to determine if it represents a statistically significant improvement over the fit of a linear equation. If the non-linear equation's quality of fit to the data is not statistically significant over the quality of fit of the linear equation, then the modeler 110 can determine that the selected model has very little curve (e.g., approaches a straight line). Therefore, in the interest of using the simplest model possible, the modeler 110, in certain embodiments, can discard the non-linear equation and revert to the corresponding linear equation for the assigned model.

In yet other embodiments, the modeler 110 can further temper the use of non-linear (e.g., exponential) equations as models for monitored data since such equations are more flexible then linear equations in modeling. Due to this flexibility, non-linear equations can be initially selected as appropriate models more often then they should, especially when dealing with data that is generally linear in nature, but that contains a relatively small number of data points at either end of a measurement period that are somewhat higher (or lower) than the remainder of the data points. The exponential equation, due to its flexibility, is generally able to model the linear portion of the data quite accurately, while still being able to curve towards the "outlying" point(s) at the end. As a consequence, the non-linear equation typically outperforms the linear equations in the quality of fit to the data.

To avoid using the exponential equation too often, thereby causing premature alerts to degrading transaction performance, the modeler 110 can implement a "double check" on the data whenever a non-linear equation (e.g., an exponential equation is determined to be the best model. For instance, the modeler 110 can, in such situations, remodel a select portion (e.g., the first two-thirds) of the monitored data. If the non-linear equation is still the best model for the select portion of the data, then the modeler 110 can continue to use the non-linear equation for the overall model. Otherwise, the modeler 110 can assume that it has detected a problem in the monitored data and can use a second-best model (e.g., a linear equation) to represent the data. This approach, in certain embodiments, helps to avoid using the exponential equation for data that is fundamentally linear but that includes a "kick up" at the end.

For those database transactions identified by the process 300 as consuming system resources at an increasing rate (Block 320), the modeler 110 projects performance trend for transactions (Block 325). Such projection can also include providing an appropriate prediction interval for the trend (Block 330).

At Block 335, based on the projected trends, the performance management subsystem 106 alerts the user of database transactions that pose a risk of problematic performance, such as those database transaction(s) whose predicted performance measurements are degrading at or above a threshold rate. In certain embodiments, subsystem 106 causes an alert, such as a pop-up window, an icon, or other graphical representation to be displayed to the user through the user interface 120.

Returning to Block 320, if the process 300 determines that there is no significant relationship between the monitored data and an independent variable of interest, the modeler 110 projects the database transaction performance to continue at an average value (Block 345).

Although the predictive management process 300 has been described with respect to particular arrangements, it should be understood that the process 300 can be used with a variety of types of data. For instance, the process 300 can be used to monitor and predict performance of computer data other than database transactions, as described above.

Moreover, when one or more SQL statements are identified as having a degrading performance (e.g. a predicted degrading performance), the user can be provided with an option to correct or improve the SQL performance. Examples of systems and methods for identifying and/or improving SQL performance are disclosed in U.S. patent application Ser. No. 12/023,920, filed Jan. 31, 2008, which is hereby incorporated herein by reference in its entirety to be considered part of this specification.

FIGS. 4A and 4B illustrate exemplary screenshots depicting effects of a trend change detection process on a prediction of database transaction performance, according to certain embodiments of the invention. In particular, FIG. 4A includes a screenshot with a graph 400 depicting the results of a predictive performance management analysis without considering trend changes of the monitored data set. For instance, the graph 400 includes various monitored data points up to a date Mar. 13, 2009. The graph 400 further includes a non-linear (exponential) data relationship curve 402 assigned based on the distribution of the monitored data points. Also, associated with the data relationship curve 402 is a prediction interval 404.

FIG. 4B illustrates a screenshot with a graph 400' depicting the results of a predictive performance management analysis after considering trend changes with respect to the same data points of the graph 400. As can be seen, the graph 400' further illustrates a detected trend change 406' that separates a first set of data points 408' around the value "0" and a second set of later data points 410' extending between the values of "200" and "1,800."

In certain embodiments, the detected trend change 406' can represent a change to an indexing scheme that has resulted in a change to the monitored SQL statement's cost. In other embodiments, the trend change 406' can reflect a change in a hardware and/or software configuration of the monitored database system. In yet other embodiments, the trend change 406' may result from other system changes as discussed above and as identified by the trend change detector 116.

As shown, the graph 400' further includes a second assigned data relationship curve 402' that corresponds to the second set of data points 410'. In particular, the curve 402' comprises a linear curve derived from data points following the trend change 406' at approximately Jan. 14, 2009. This data relationship curve 402' is further associated with a prediction interval 404'.

In comparing the graphs 400 and 400', it is evident that the data relationship curves 402, 402' are based on the same monitored data but result in substantially different predictions. Without the detected trend change 406', the graph 400 results in an exponential relationship curve 402 that may not accurately reflect the current data trend. For instance, on Jan. 6, 2010, the graph 400 predicts the value of the monitored data to reach a value of nearly "5,000," with a prediction interval 404 that extends from "0" to over "12,000." In addition to the prediction interval 404 having a relatively wide range, the predicted values may result in premature performance alerts associated with the database system.

On the other hand, when taking into account the trend change 406', and disregarding the first set of data points 408', the graph 400' results in a more precise, linear curve 402' with the prediction interval 404' extending less than half the range of the prediction interval 404 at Jan. 6, 2010. Also, on Jan. 6, 2010, the graph 400' predicts the value of the monitored data to be approximately "2,500," nearly half the projected value from the graph 400, which does not account for trend changes.

Figure 4C:
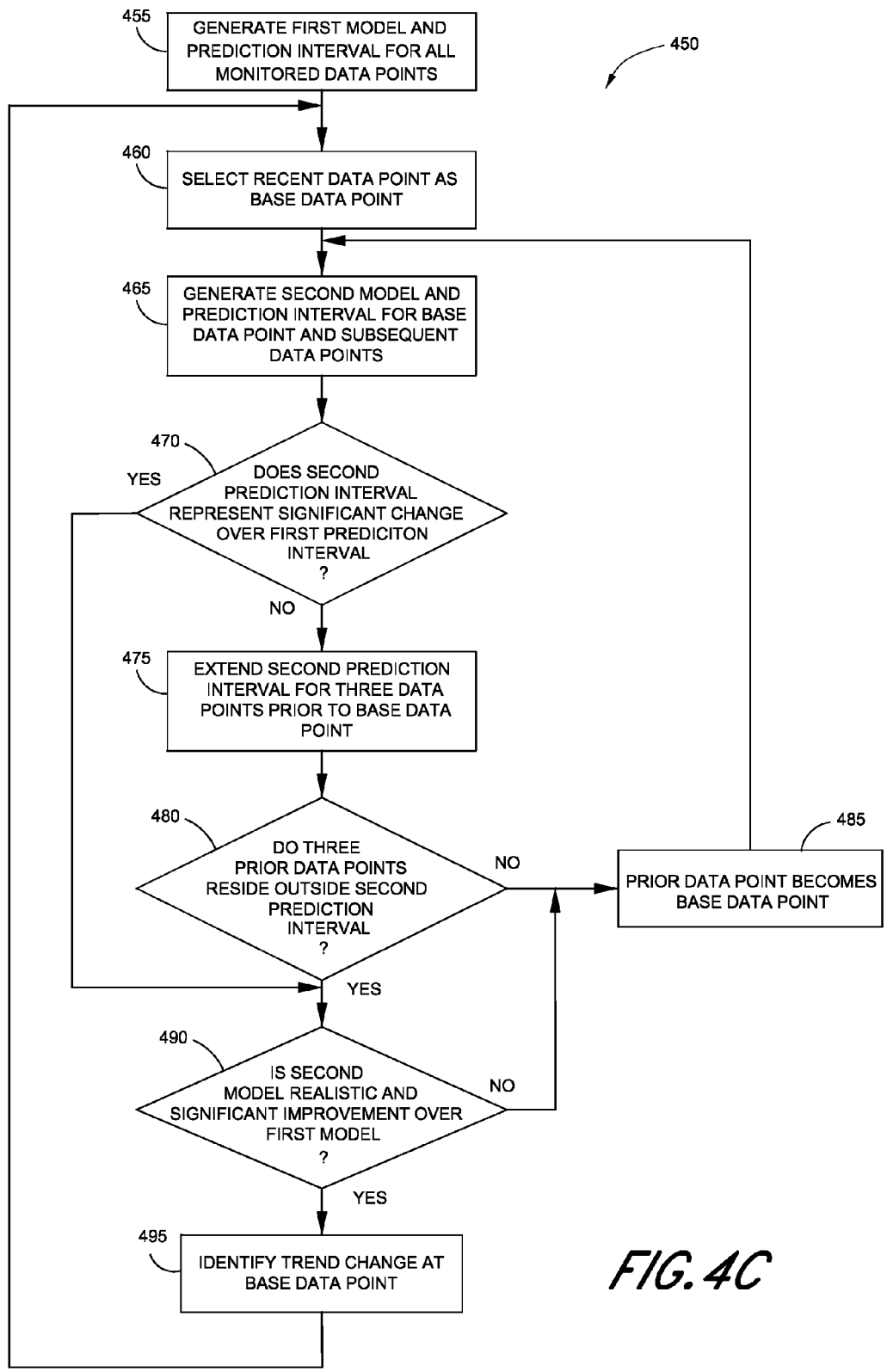
FIG. 4C illustrates a flowchart of an exemplary embodiment of a trend change detection process that can be executed by the performance management subsystem of FIG. 1.

FIG. 4C illustrates a flowchart of an exemplary trend change detection process 450 usable with embodiments of the invention. In certain embodiments, the process 450 can be executed by the trend change detector 116 to alert the user of potential trend changes within monitored data that may reflect a change in the database system and that can potentially disturb the integrity of a model. For exemplary purposes, the process 450 will be described with reference to the components of the database system 100 of FIG. 1.

At Block 455, the modeler 110 generates a first model and a first prediction interval for all the monitored data points. For example, in certain embodiments, the modeler 110 can assign one of the data relationships 112 (e.g., curves) that best represents overall the monitored data. The modeler 110 can further use information stored in the prediction intervals 114 to create the first prediction interval.

At Block 460, the trend change detector 116 selects a recent data point as a base data point from which initial calculations are made. In certain embodiments, the base data point advantageously comprises the eighth most recent data point, which provides for sufficient subsequent data points to be used in modeling. In yet other embodiments, the recent data point can comprise any data point prior to or after the eighth most recent data point other than the first data point and the final data point.

At Block 465, the modeler 110 generates a second model that represents the range of data points from the base data point to the final data point. The modeler 110 further calculates a second prediction interval associated with the second model. In certain embodiments, the first and/or second prediction intervals are set such that the probability that any one point will reside outside the particular prediction interval is approximately five percent. In yet other embodiments, the first and/or second prediction intervals can comprise a more tight range (e.g., a higher probability that a point will reside outside the prediction interval) or a more expansive range.

At Block 470, the process 450 determines if there is a significant change between the first prediction interval and the second prediction interval. In certain embodiments, the trend change detector 116 determines whether or not an abrupt change exists between the sizes of the first and second prediction intervals at or near the base data point. If such a change does exist, the trend change detector 116 can identify the base data point as possibly representing a trend change, and the process 450 continues with Block 490.

In certain embodiments, the trend change detector 116 can identify the possible trend change even if the second model does not represent a significant change from the first model. For instance, in one example, data prior to the base data point containing little variance or noise (a tight prediction interval) may be represented by a linear first model. However, from the base data point forward, the data continues along the same general, linear model, but the variance or noise (a wider prediction interval) in the data increases significantly. In such embodiments, the trend change detector 116 at Block 470, can identify this point as a possible trend change that reflects an underlying change in database system or its data.

If the second prediction interval does not represent a significant change from the first prediction interval, the second prediction interval is extended back for three data points (e.g. three consecutive data points) prior to the base data point (Block 475). The trend change detector 116 then determines if each of the three data points resides outside the extended second prediction interval (Block 480). In these two blocks, the trend change detection process 450 can extend the second model backwards to try and determine whether or not the data points immediately prior to the second model fall within the associated prediction interval. If the prior points do not reside within the second prediction interval, then it is likely that the second model (e.g., representing the base data point and subsequent data points) is not appropriate for the data points prior to the base data point. In such situations, it is possible that a trend change may exist at the base data point.

In yet other embodiments, the trend change detection process 450 can include extending the second prediction interval more or less than three data points and/or can determine if less than all of the selected prior data points resides outside the second prediction interval.

If at least one of the three prior data points resides within the second prediction interval, a prior data point becomes the base data point (Block 485) and Blocks 465-480 are repeated. In such a manner, the trend change detection process 450 can evaluate a substantial portion of the monitored raw data.

However, if all three of the prior data points reside outside the second prediction interval, there is a possibility that the base data point represents a trend change. In deciding whether or not a significant trend change exists, the trend change detection process 450 determines if the second model representing the base data point forward is a significant improvement over the first model representing all the data points (Block 490). In certain embodiments, the trend change detector 116 determines if the second model is realistic and represents a statistically significant improvement over the first model. For example, if the second model is an exponential or logarithmic model that is excessively curved, the trend change detector 116 can be configured to ignore the second model. Such processing can prevent falsely detecting a change point by fitting unrealistic models to sections of the data.

If the second model is unrealistic or does not represent a significant improvement over the first model, the trend change detection process 450 continues with Block 485, wherein the prior data point becomes the new base data point. In yet other embodiments, at Block 485 the process 450 can further record in a list the old base data point with the second model that does not represent a significant statistical improvement. As the process 450 continues with analyzing the prior data points for trend changes, the process 450 may determine that the new base data point (i.e., prior data point to the old base data point) is associated with a second model that does represent a significant statistical improvement. In such situations, the process 450 can revisit the data point(s) in the list to determine if a trend change determination should be "back dated" to the old base data point.

However, if at Block 490 the second model does represent a significant improvement, the trend change detector 116 identifies a trend change at the base data point (Block 495). In certain embodiments, the trend change detector 116 causes a graphical display on the user interface 120 to identify to the user the detected trend change (e.g., detected trend change line 406' of FIG. 4B).

Although the trend change detection process 450 has been described with reference to particular arrangements, other embodiments of the process 450 may have more or fewer blocks than those depicted in FIG. 4C. For instance, in certain embodiments, the trend change detection process 450 can further account for detecting changes in raw data having a distinct stepped formation. For example, the process 450 can monitor for a significant change in a prediction interval size when shifting a base data point from the first data point of an upper step to a last data point of a lower step (or vice-versa). Due to such monitoring, the process 450 can identify the first data point of the upper step, rather than the last data point of the lower step, as representing the trend change.

Moreover, in situations wherein the base data point represents a significant outlier from the other data points, embodiments of the trend change detection process 450 can ignore large fluctuations in a calculated prediction interval caused by the outlier. For instance, the process 450 can test whether or not the base data point is within a prediction interval of the first model that represents all the data. If the base data point is outside this first prediction interval and is associated with a large change in the calculated interval, the process 450 can ignore the base data point as an outlier. In yet other embodiments, the process 450 can function without Block 490.

Moreover, in certain embodiments, the process 450 can operate with a fewer number of blocks than those illustrated in FIG. 4C. For instance, the process 450 can identify trend changes in monitored data without executing Block 470 or Blocks 475 and 480. In yet other embodiments, Block 470 can be executed in parallel with or following Blocks 475 and 480.

Figure 5:
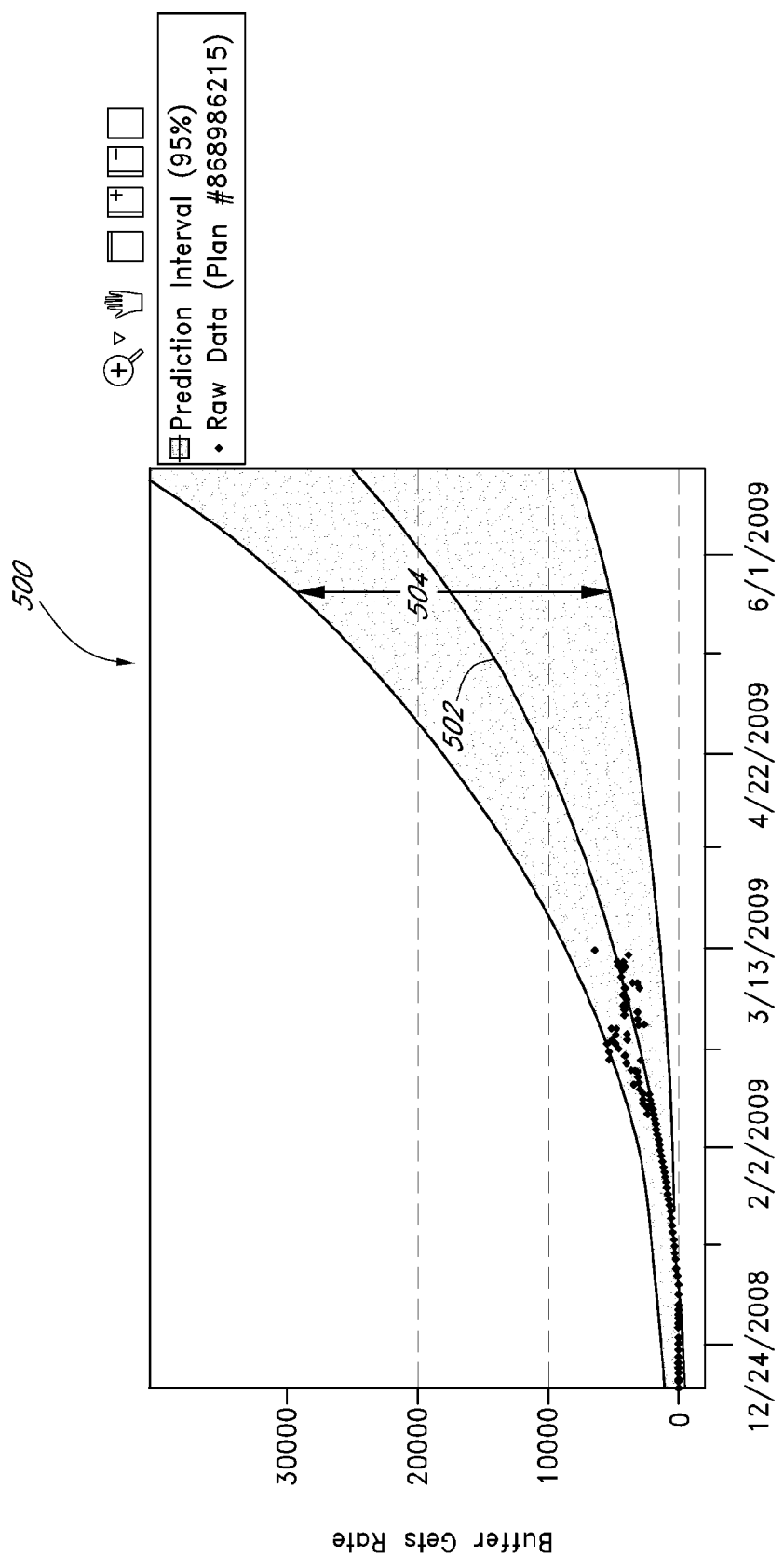
FIG. 5 illustrates an exemplary screenshot of a prediction interval for predicting database transaction performance, according to certain embodiments of the invention.

FIG. 5 illustrates an exemplary screenshot of a prediction interval for prediction of database transaction performance, according to certain embodiments of the invention. In particular, FIG. 5 depicts a graph 500 with a non-linear data relationship curve 502 and an associated prediction interval 504. As illustrated, the prediction interval 504 widens as the prediction moves further into the future.

In certain embodiments, the modeler 110 generates the prediction interval 504. Moreover, in certain embodiments, the modeler 110 can execute a curve simplification algorithm, such as a polygon simplification algorithm, that simplifies data points for generating the prediction interval 504. For instance, certain data relationship curves or models can be highly curved at one end and reasonably straight at the other (e.g., logarithmic or exponential curves). In order for the prediction interval 504 to be rendered nicely on the user interface 120, the prediction interval 504 does not require a relatively large number of data points in straight sections, but can use a larger number of data points at the curved sections for rendering.

When generating the prediction interval, the modeler 110 may encounter a large number of data points. To reduce the number of data points without affecting the shape of the prediction interval 504 that is rendered, the data points can be passed through a curve simplification algorithm. For example, certain algorithms inspect second derivatives of the curve being simplified or that determine the longest straight lines that can reasonably simplify the original set of data points.

FIG. 6 illustrates an exemplary screenshot of a table 600 for identifying potential bottlenecks in a database system, according to certain embodiments of the invention. In particular, the table 600 includes timing data related to various system component performance areas. The table 600 further includes a model type column 602 that provides the user with the projected status of the monitored performance area. For instance, in certain embodiments, the model type column 602 may be represented by one or more curve icons having one of several colors that represent predicted performance. A "green" curve icon may represent predicted performance that is within an acceptable range; a "yellow" curve icon may represent predicted performance that is approaching a range of concern; and a "red" curve icon may represent performance values that are predicted to be problematic.

In certain embodiments, such a straightforward graphical display enables a system administrator or other user to quickly identify and/or preempt potential bottlenecks in the database system. Moreover, such bottleneck prediction can direct an administrator to further explore specific database transactions that may be affecting the database system performance. In yet further embodiments, the table 600 can include additional types of graphical alerts that convey information to a user, such as, for example, colored icons that identify where an alarm is occurring and/or its severity.

Figure 7:
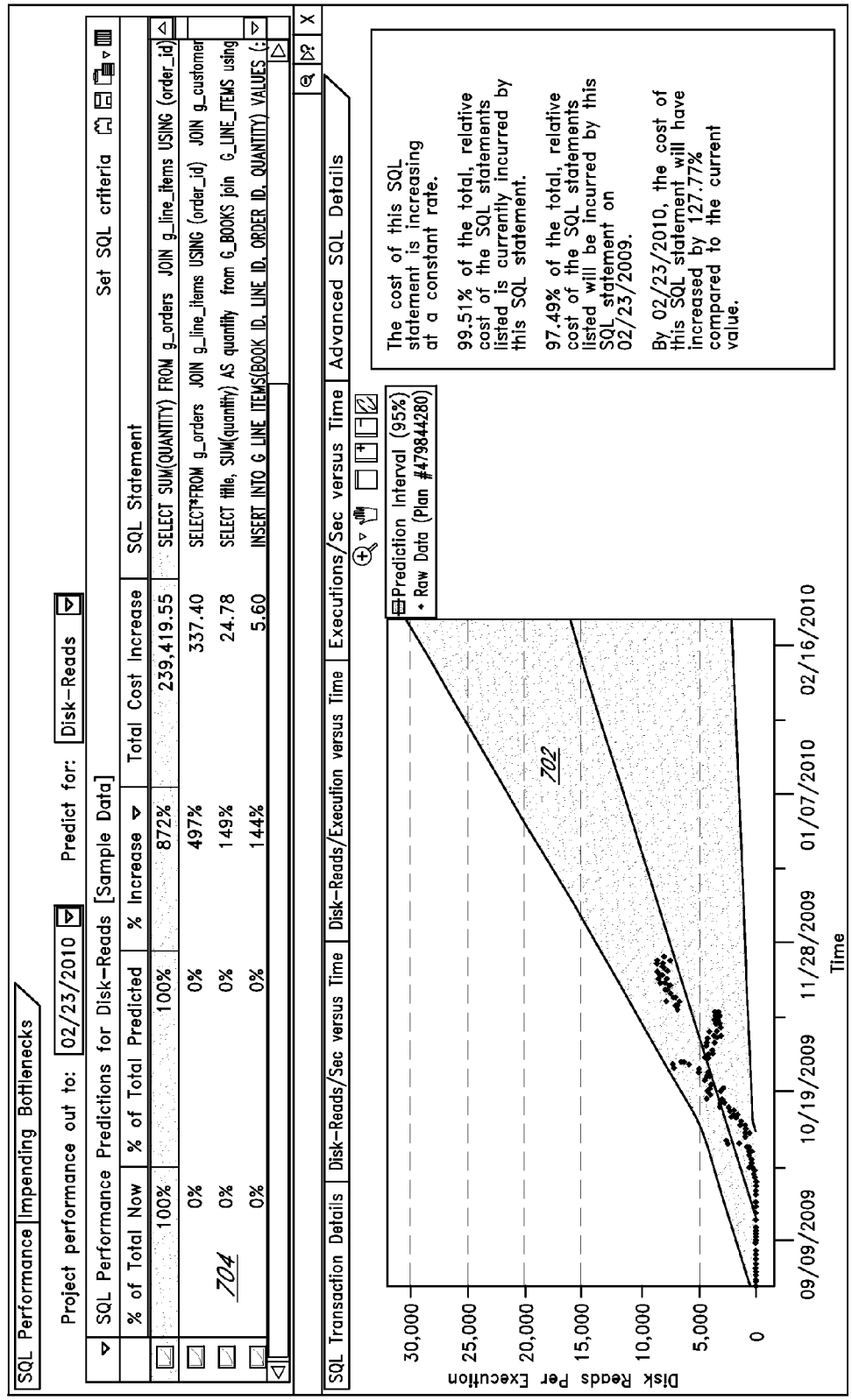
FIG. 7 illustrates an exemplary screenshot of a user interface for indentifying potentially problematic database transaction performance trends, according to certain embodiments of the invention.

FIG. 7 illustrates an exemplary screenshot of a user interface 700 for identifying potentially problematic database transaction performance trends, according to certain embodiments of the invention. In particular, the user interface 700 includes a graph 702 that depicts predicted performance with respect to disk reads per execution over time. The user interface 700 further includes a table 704 that identifies a plurality of SQL statements and associated predicted performance metrics. In certain embodiments, the information displayed in the graph 702 corresponds to a selected row (e.g., SQL statement) of the table 704.

Figure 8:
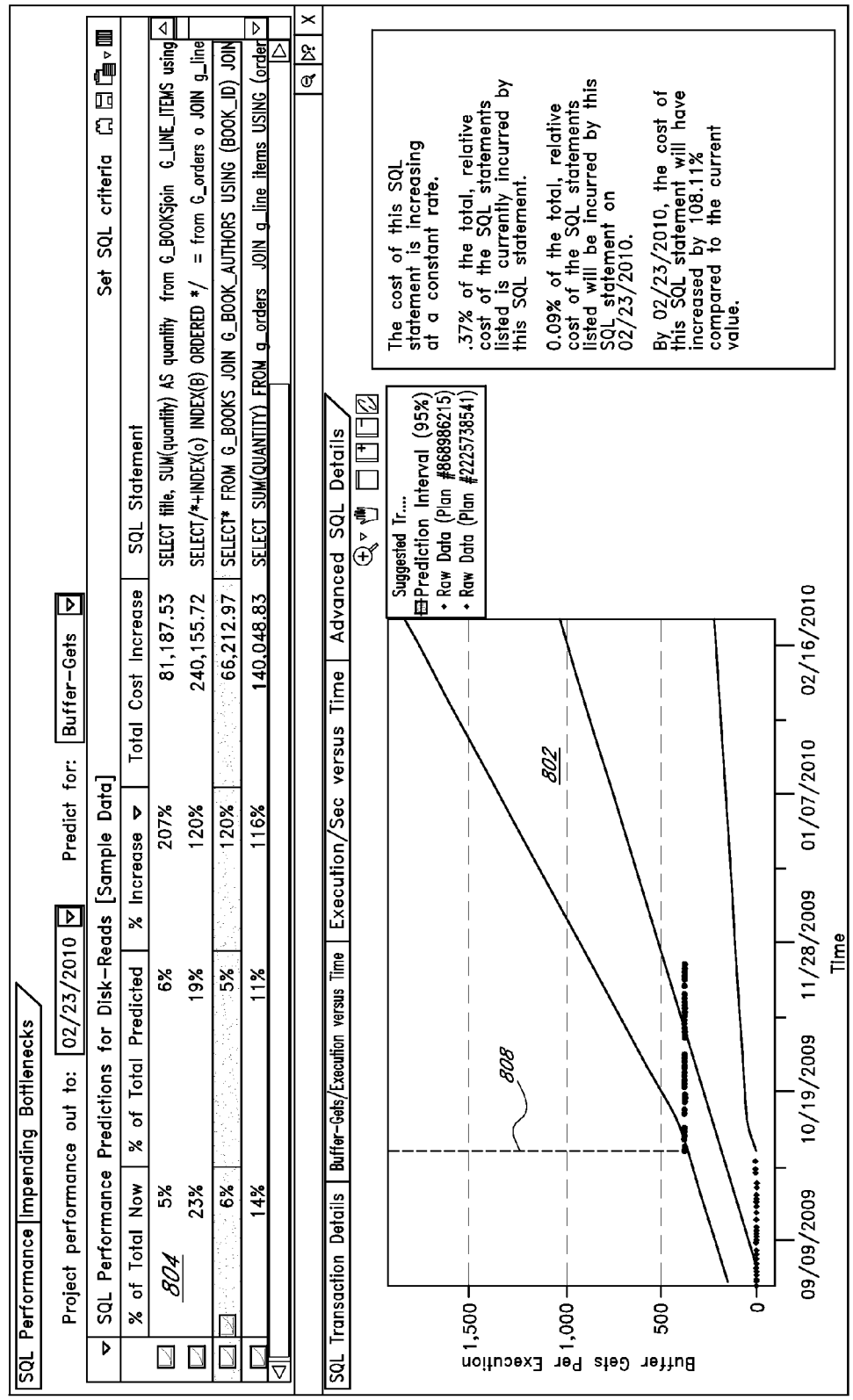
FIG. 8 illustrates an exemplary screenshot of a user interface for predicting database transaction performance before identifying trend change occurrences, according to certain embodiments of the invention.

FIG. 8 illustrates an exemplary screenshot of a user interface 800 for predicting database transaction performance without identifying trend change occurrences, according to certain embodiments of the invention. In particular, the user interface 800 includes a graph 802 that depicts predicted performance with respect to buffer gets per execution (e.g., logical reads) over time. The user interface 800 further includes a table 804 that identifies a plurality of SQL statements and associated predicted performance metrics.

As shown, the table 804 further comprises a trend change icon 806 that indicates a trend change has been detected with respect to the monitored performance data of a particular SQL statement. For instance, the illustrated trend change icon 806 corresponds to a trend change indicator 808 of the graph 802. In certain embodiments, the trend change icon 806 notifies the user of a suggested trend change, which the user can then either accept or reject based on the user's analysis of the data.

FIG. 9 illustrates an exemplary screenshot of a user interface 900 with an expanded table 904 that corresponds to the table 804 of FIG. 8. In particular, the table 904 includes performance data, both monitored and predicted, for a plurality of SQL statements. The table 904 further comprises a trend change icon 906 that indicates a trend change has been detected with respect to the monitored performance data of a particular SQL statement. Moreover, the table 904 includes a model type column 908 that provides the user with a summary projected performance status of the monitored SQL statement.

Figure 10:
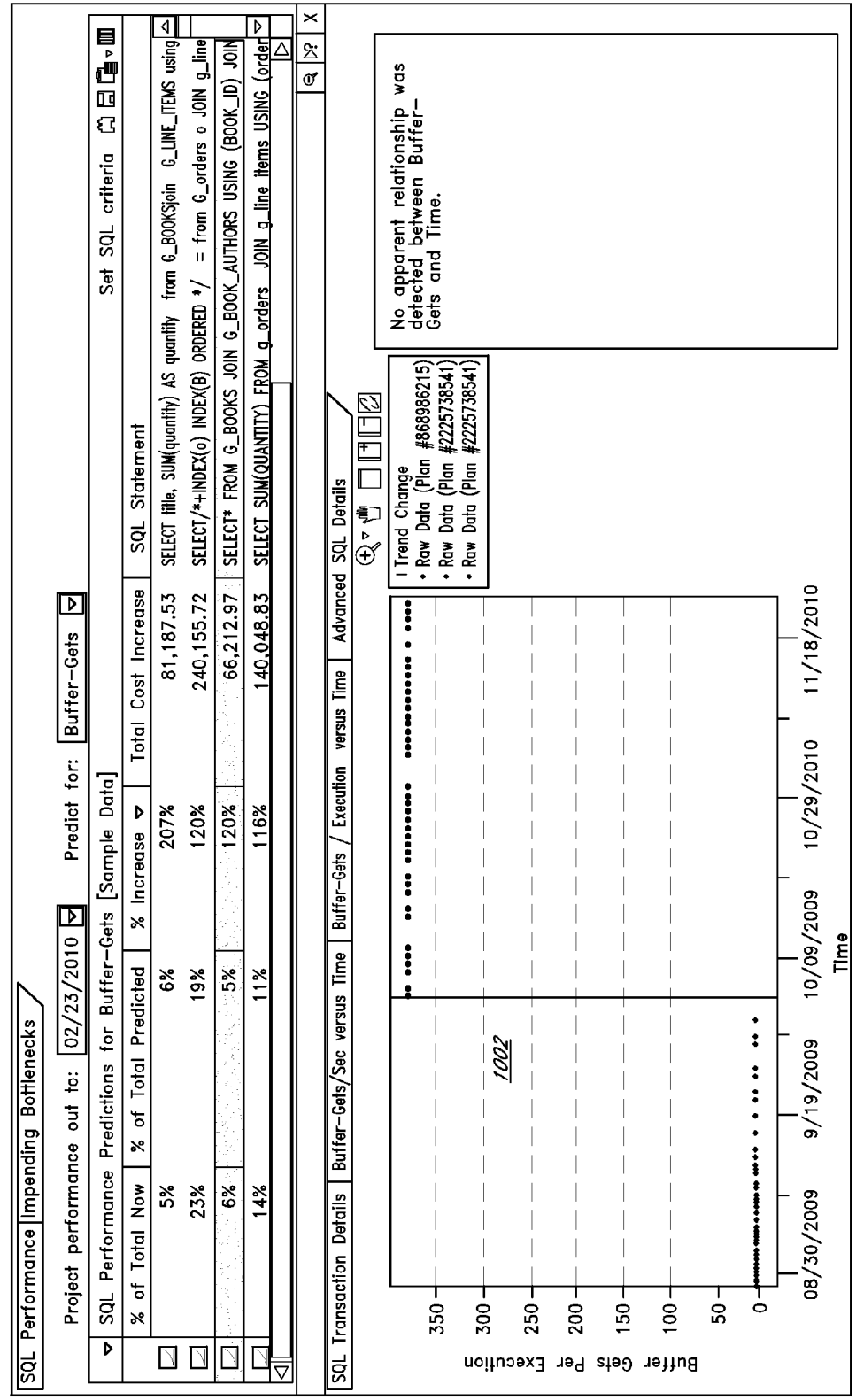
FIG. 10 illustrates an exemplary screenshot of a user interface for analyzing database transaction performance after identifying trend change occurrences, according to certain embodiments of the invention.

FIG. 10 illustrates an exemplary screenshot of a user interface 1000 for predicting database transaction performance after identifying trend change occurrences, according to certain embodiments of the invention. In particular, the user interface 1000 includes a graph 1002 plotting the same monitored data points as those illustrated in the graph 802 of FIG. 8. The graph 1002, however, shows that after a proposed trend change is accepted, there is no longer a projected increase in the logical reads of the selected SQL statement. Rather, the graph 1002 shows that no substantial relationship exists between the number of logical reads and time.

Furthermore, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for managing performance of database transactions, the system comprising:
   at least one database configured to store data;
   at least one application configured to interact with the data of the at least one database through a plurality of database transactions that comprise structured query language (SQL) statements; and
   a management subsystem configured to generate one or more alerts identifying degrading ones of the SQL statements, the management subsystem configured to execute on one or more computing devices and comprising,
      a monitor module comprising one or more computer hardware processors, the monitor module configured to track one or more performance measurements of the plurality of the SQL statements,
      a modeler module comprising one or more computer hardware processors, the modeler module configured to correlate the one or more tracked performance measurements beginning at a first data point of the particular SQL statement with one or more independent variables and to assign at least a first performance model to represent the one or more tracked performance measurements to generate a first trend of predicted performance measurements of the particular SQL statement,
      a trend change module configured to automatically detect within the one or more tracked performance measurements at least one substantial trend change in the first trend of the one or more tracked performance measurements,
      wherein the trend change module automatically detects a trend change by iteratively selecting a second data point for the modeler module to generate at least a second performance model for a second trend of predicted performance measurements beginning at the second data point, wherein detection of the trend change by the trend change module includes at least determining that at least three measured data points prior to the second data point fall outside of the second trend, and
      an interface module configured to trigger an alert when the second trend of the second performance model indicates that the predicted performance measurements of the particular SQL statement are degrading at or above a threshold rate to identify whether the particular SQL statement needs to be tuned;
      wherein the second performance model indicates whether I/O channels associated with the execution of the plurality of SQL statements will near capacity in the future.

2. The system of claim 1, wherein the one or more first performance models and the second performance model are selected from a set of predetermined performance models.

3. The system of claim 2, wherein the management subsystem further comprises a memory configured to store the set of predetermined performance models.

4. The system of claim 1, wherein the threshold rate comprises an exponential rate.

5. A system for managing performance of database transactions, the system comprising:
   at least one database configured to store data;
   at least one application configured to interact with the data of the at least one database through a plurality of database transactions that comprise structured query language (SQL) statements; and a management subsystem configured to generate one or more alerts identifying degrading ones of the SQL statements, the management subsystem configured to execute on one or more computing devices and comprising,
- a monitor module comprising one or more computer hardware processors, the monitor module configured to track one or more performance measurements of the plurality of the SQL statements, the one or more performance measurements comprising at least one of (i) a total cost of execution of a particular SQL statement of the plurality of SQL statements, (ii) an average cost of all executions of the particular SQL statement, and (iii) an execution rate of the particular SQL statement,
- a modeler module comprising one or more computer hardware processors, the modeler module configured to correlate the one or more tracked performance measurements beginning at a first data point of the particular SQL statement with one or more independent variables and to assign at least a first performance model to represent the one or more tracked performance measurements to generate a first trend of predicted performance measurements of the particular SQL statement,
- a trend change module configured to automatically detect within the one or more tracked performance measurements at least one substantial trend change in the first trend of the one or more tracked performance measurements,
  - wherein the trend change module automatically detects a trend change by iteratively selecting a second data point for the modeler module to generate at least a second performance model for a second trend of predicted performance measurements beginning at the second data point and determining that the second trend is significantly better than the first trend at predicting the tracked performance measurements, and
- an interface module configured to trigger an alert when the second trend of the second performance model indicates that the predicted performance measurements of the particular SQL statement are degrading at or above a threshold rate to identify whether the particular SQL statement needs to be tuned;
- wherein the one or more first performance models and the second performance model are selected from a set of predetermined performance models;
- wherein the management subsystem further comprises a memory configured to store the set of predetermined performance models; and
- wherein the set of predetermined performance models comprises logarithmic, linear and exponential curves.

6. A method for managing database performance, the method comprising:
- monitoring with one or more computer hardware processors, performance values of a plurality of database transactions that comprise structured query language (SQL) statements;
- storing the performance values in a storage device;
- correlating with one or more computer hardware processors, the performance values of at least one of the SQL statements with one or more independent variables;
- assigning at least a first performance model to represent past and predicted performance of the at least one SQL statement;
- detecting among the correlated one or more performance values a first performance value representing a change in a first trend of performance of the at least one SQL statement;
- dividing at the first performance value the correlated one or more performance values into a plurality of segments;
- generating at least a second performance model to represent at least one of the plurality of segments, the second performance model indicating a trend change in the first trend that determines a second trend of predicted performance of the at least one SQL statement;
- issuing an alert when the second performance model indicates that the predicted second trend of performance of the at least one SQL statement is degrading at or above a threshold rate to identify whether the particular SQL statement needs to be tuned;
- wherein the second performance model indicates whether I/O channels associated with the execution of the plurality of SQL statements will near capacity in the future.

7. The method of claim 6, wherein the one or more independent variables comprises a time variable.

8. The method of claim 6, further comprising associating a prediction interval with the second performance model.

9. The method of claim 8, wherein said detecting further comprises identifying a predetermined number of data values immediately preceding the first performance value that reside outside the prediction interval.

10. The method of claim 6, further comprising comparing the second performance model with the first performance model to determine if the second performance model represents a statistical improvement over the first performance model in representing the past and predicted performance of the at least one database transaction.

11. The method of claim 6, further comprising automatically issuing the alert when the second performance model comprises an exponential curve.

12. A method for managing database performance, the method comprising:
- monitoring, with one or more computer hardware processors, performance values of a plurality of database transactions that comprise structured query language (SQL) statements;
- storing the performance values in a storage device;
- correlating, with one or more computer hardware processors, the performance values of at least one of the SQL statements with one or more independent variables;
- assigning at least a first performance model to represent past and predicted performance of the at least one SQL statement;
- detecting among the correlated one or more performance values a first performance value representing a change in a first trend of performance of the at least one SQL statement;
- dividing at the first performance value the correlated one or more performance values into a plurality of segments;
- generating at least a second performance model to represent at least one of the plurality of segments, the at least the second performance model indicating a trend change in the first trend that determines a second trend of predicted performance of the at least one SQL statement;
- automatically detecting the trend change by a process that includes comparing calculations of the first performance model with calculations of the second performance model;
- issuing an alert when the second performance model indicates that the predicted second trend of performance of the at least one SQL statement is degrading at or above a threshold rate to identify whether the particular SQL statement needs to be tuned;

associating a prediction interval with the second performance model; and calculating the prediction interval such that a probability that a selected performance value resides outside the prediction interval is at most approximately five percent.

13. The method of claim 12, further comprising displaying on a user interface at least a portion of the correlated one or more performance values, the second performance model and a trend change identifier at the first performance value.

* * * * *